US011016956B2

(12) United States Patent
Proctor et al.

(10) Patent No.: US 11,016,956 B2
(45) Date of Patent: *May 25, 2021

(54) DATABASE MANAGEMENT SYSTEM WITH DATABASE HIBERNATION AND BURSTING

(71) Applicant: NuoDB, Inc., Cambridge, MA (US)

(72) Inventors: Seth Proctor, Arlington, MA (US); Jacob Getto, Cambridge, MA (US); Paul D. Smith, Lexington, MA (US)

(73) Assignee: NuoDB, Inc., Cambridge, MA (US)

( * ) Notice: Subject to any disclaimer, the term of this patent is extended or adjusted under 35 U.S.C. 154(b) by 300 days.

This patent is subject to a terminal disclaimer.

(21) Appl. No.: 16/022,098

(22) Filed: Jun. 28, 2018

(65) Prior Publication Data
US 2019/0197028 A1 Jun. 27, 2019

Related U.S. Application Data

(63) Continuation of application No. 14/247,364, filed on Apr. 8, 2014, now Pat. No. 10,037,348.
(Continued)

(51) Int. Cl.
*G06F 16/21* (2019.01)
(52) U.S. Cl.
CPC .................. *G06F 16/217* (2019.01)
(58) Field of Classification Search
CPC .................................... G06F 16/217
See application file for complete search history.

(56) References Cited

U.S. PATENT DOCUMENTS 4,853,843 A 8/1989 Ecklund
5,446,887 A 8/1995 Berkowitz
(Continued)

FOREIGN PATENT DOCUMENTS

EA 002931 B1 10/2002
EP 1403782 A2 3/2004
(Continued)

OTHER PUBLICATIONS

"Album Closing Policy," Background, retrieved from the Internet at URL:http://tools/wiki/display/ENG/Album+Closing+Policy (Jan. 29, 2015), 4 pp.
(Continued)

*Primary Examiner* — Albert M Phillips, III
(74) *Attorney, Agent, or Firm* — Smith Baluch LLP

(57) ABSTRACT

A data processing network includes a database management for a plurality of databases serviced by a server comprising a plurality of data processors. Each server data processor includes a copy of the database management system and a monitor for measuring and analyzing various parameters for each server data processor and each included database and performing various methods transparently to a user. For example, when a parameter or combination thereof indicates that a database in one data processor is inactive or requires additional resources, that database is set to an inactive state or is transferred to another data processor with greater resources, respectively. An inactive database is recalled upon receipt of a request for access to that database. A database in a data processor of greater resources can be returned to a server data processor or another data processor with fewer resources. These operations are transparent to database users and independent of user or administrator intervention.

20 Claims, 7 Drawing Sheets

Related U.S. Application Data

(60) Provisional application No. 61/809,701, filed on Apr. 8, 2013.

(56) References Cited

U.S. PATENT DOCUMENTS

| | | | |
|---|---|---|---|
| 5,524,240 | A | 6/1996 | Barbara et al. |
| 5,555,404 | A | 9/1996 | Torbj et al. |
| 5,568,638 | A | 10/1996 | Hayashi et al. |
| 5,701,467 | A | 12/1997 | Freeston |
| 5,764,877 | A | 6/1998 | Lomet et al. |
| 5,960,194 | A | 9/1999 | Choy et al. |
| 6,216,151 | B1 | 4/2001 | Antoun |
| 6,226,650 | B1 | 5/2001 | Mahajan et al. |
| 6,275,863 | B1 | 8/2001 | Leff et al. |
| 6,334,125 | B1 | 12/2001 | Johnson et al. |
| 6,401,096 | B1 | 6/2002 | Zellweger |
| 6,424,967 | B1 | 7/2002 | Johnson et al. |
| 6,480,857 | B1 | 11/2002 | Chandler |
| 6,499,036 | B1 | 12/2002 | Gurevich |
| 6,523,036 | B1 | 2/2003 | Hickman et al. |
| 6,748,394 | B2 | 6/2004 | Shah et al. |
| 6,792,432 | B1 | 9/2004 | Kodavalla et al. |
| 6,862,589 | B2 | 3/2005 | Grant |
| 7,026,043 | B2 | 4/2006 | Jander |
| 7,080,083 | B2 | 7/2006 | Kim et al. |
| 7,096,216 | B2 | 8/2006 | Anonsen |
| 7,219,102 | B2 | 5/2007 | Zhou et al. |
| 7,233,960 | B1 | 6/2007 | Boris et al. |
| 7,293,039 | B1 | 11/2007 | Deshmukh et al. |
| 7,353,227 | B2 | 4/2008 | Wu |
| 7,395,352 | B1 | 7/2008 | Lam et al. |
| 7,401,094 | B1 | 7/2008 | Kesler |
| 7,403,948 | B2 | 7/2008 | Ghoneimy et al. |
| 7,562,102 | B1 | 7/2009 | Sumner et al. |
| 7,853,624 | B2 | 12/2010 | Friedlander et al. |
| 7,890,508 | B2 | 2/2011 | Gerber et al. |
| 8,108,343 | B2 | 1/2012 | Wang et al. |
| 8,224,860 | B2 | 7/2012 | Starkey |
| 8,266,122 | B1 | 9/2012 | Newcombe et al. |
| 8,504,523 | B2 | 8/2013 | Starkey |
| 8,756,237 | B2 | 6/2014 | Stillerman et al. |
| 9,501,363 | B1 | 11/2016 | Ottavio |
| 9,734,021 | B1 | 8/2017 | Sanocki et al. |
| 10,037,348 | B2 | 7/2018 | Proctor et al. |
| 2002/0112054 | A1* | 8/2002 | Hatanaka ............... H04L 67/22 709/225 |
| 2002/0152261 | A1 | 10/2002 | Arkin et al. |
| 2002/0152262 | A1 | 10/2002 | Arkin et al. |
| 2002/0178162 | A1 | 11/2002 | Ulrich et al. |
| 2003/0051021 | A1 | 3/2003 | Hirschfeld et al. |
| 2003/0149709 | A1 | 8/2003 | Banks |
| 2003/0204486 | A1 | 10/2003 | Berks et al. |
| 2003/0220935 | A1 | 11/2003 | Vivian et al. |
| 2004/0153459 | A1* | 8/2004 | Whitten ................ G06F 16/214 |
| 2004/0263644 | A1 | 12/2004 | Ebi |
| 2005/0013208 | A1 | 1/2005 | Hirabayashi et al. |
| 2005/0086384 | A1 | 4/2005 | Ernst |
| 2005/0198062 | A1* | 9/2005 | Shapiro ............... G06F 16/2282 |
| 2005/0216502 | A1 | 9/2005 | Kaura et al. |
| 2006/0010130 | A1 | 1/2006 | Leff et al. |
| 2007/0067349 | A1 | 3/2007 | Jhaveri et al. |
| 2007/0260696 | A1* | 11/2007 | Bohannon ........... G06F 11/1662 709/208 |
| 2008/0086470 | A1 | 4/2008 | Graefe |
| 2008/0228795 | A1 | 9/2008 | Lomet |
| 2008/0320038 | A1 | 12/2008 | Liege |
| 2009/0113431 | A1 | 4/2009 | Whyte |
| 2010/0094802 | A1 | 4/2010 | Luotojarvi et al. |
| 2010/0153349 | A1 | 6/2010 | Schroth et al. |
| 2010/0191884 | A1 | 7/2010 | Holenstein et al. |
| 2010/0235606 | A1 | 9/2010 | Oreland et al. |
| 2010/0297565 | A1 | 11/2010 | Waters et al. |
| 2011/0087874 | A1 | 4/2011 | Timashev et al. |
| 2011/0231447 | A1 | 9/2011 | Starkey |
| 2012/0254175 | A1 | 10/2012 | Horowitz et al. |
| 2013/0060922 | A1 | 3/2013 | Koponen et al. |
| 2013/0110766 | A1 | 5/2013 | Promhouse et al. |
| 2013/0110774 | A1 | 5/2013 | Shah et al. |
| 2013/0110781 | A1 | 5/2013 | Golab et al. |
| 2013/0159265 | A1 | 6/2013 | Peh et al. |
| 2013/0159366 | A1 | 6/2013 | Lyle et al. |
| 2013/0232378 | A1 | 9/2013 | Resch et al. |
| 2013/0262403 | A1 | 10/2013 | Milousheff et al. |
| 2013/0311426 | A1 | 11/2013 | Erdogan et al. |
| 2014/0108414 | A1 | 4/2014 | Stillerman et al. |
| 2014/0279881 | A1 | 9/2014 | Tan et al. |
| 2014/0297676 | A1 | 10/2014 | Bhatia et al. |
| 2015/0019739 | A1 | 1/2015 | Attaluri et al. |
| 2015/0032695 | A1 | 1/2015 | Tran et al. |
| 2015/0066858 | A1 | 3/2015 | Sabdar et al. |
| 2015/0370505 | A1 | 12/2015 | Shuma et al. |
| 2016/0134490 | A1 | 5/2016 | Balasubramanyan et al. |
| 2017/0039099 | A1 | 2/2017 | Ottavio |

FOREIGN PATENT DOCUMENTS

| | | | |
|---|---|---|---|
| JP | 2003256256 | A | 9/2003 |
| JP | 2006048507 | A | 2/2006 |
| JP | 2007058275 | A | 3/2007 |

OTHER PUBLICATIONS

"Distributed Coordination in NuoDB," YouTube, retrieved from the Internet at URL:https://www.youtube.com/watch?feature=player_embedded&v=URoeHvflVKg on Feb. 4, 2015, 2 pp.

"Glossary—NuoDB 2.1 Documentation / NuoDB," retrieved from the Internet at URL: http://doc.nuodb.com/display/doc/Glossary on Feb. 4, 2015, 1 pp.

"How It Works," retrieved from the Internet at URL: http://www.nuodb.com/explore/newsql-cloud-database-how-it-works?mkt_tok=3RkMMJW on Feb. 4, 2015, 4 pp.

"How to Eliminate MySQL Performance Issues," NuoDB Technical Whitepaper, Sep. 10, 2014, Version 1, 11 pp.

"Hybrid Transaction and Analytical Processing with NuoDB," NuoDB Technical Whitepaper, Nov. 5, 2014, Version 1, 13 pp.

"No Knobs Administration," retrieved from the Internet at URL: http://www.nuodb.com/explore/newsql-cloud-database-product/auto-administration on Feb. 4, 2015, 4 pp.

"NuoDB at a Glance," retrieved from the Internet at URL: http://doc.nuodb.com/display/doc/NuoDB+at+a+Glance on Feb. 4, 2015, 1 pp.

"SnapShot Albums," Transaction Ordering, retrieved from the Internet at URL:http://tools/wiki/display/ENG/Snapshot+Albums (Aug. 12, 2014), 4 pp.

"Table Partitioning and Storage Groups (TPSG)," Architect's Overview, NuoDB Technical Design Document, Version 2.0 (2014), 12 pp.

"The Architecture & Motivation for NuoDB," NuoDB Technical Whitepaper, Oct. 5, 2014, Version 1, 27 pp.

"Welcome to NuoDB Swifts Release 2.1 GA," retrieved from the Internet at URL: http://dev.nuodb.com/techblog/welcome-nuodb-swifts-release-21-ga on Feb. 4, 2015, 7 pp.

"What Is a Distributed Database? and Why Do You Need One," NuoDB Technical Whitepaper, Jan. 23, 2014, Version 1, 9 pp.

Advisory Action issued by the United States Patent and Trademark Office for U.S. Appl. No. 14/215,461, dated Jan. 10, 2017, 9 pages.

Amazon CloudWatch Developer Guide API, Create Alarms That or Terminate an Instance, Jan. 2013, pp. 1-11.

Amazon RDS FAQs, Oct. 4, 2012, 39 pages.

Bergsten et al., "Overview of Parallel Architectures for Databases," The Computer Journal vol. 36, No. 8, pp. 734-740 (1993).

Connectivity Testing with Ping, Telnet, Trace Route and NSlookup (hereafter help.webcontrolcenter), Article ID:1757, Created: Jun. 17, 2013 at 10:45 a.m., https://help.webcontrolcenter.com/kb/a1757/connectivity-testing-with-ping-telnet-trace-route-and-nslookup.aspx, 6 pages.

(56) References Cited

OTHER PUBLICATIONS

Dan et al., "Performance Comparisons of Buffer Coherency Policies," Proceedings of the International Conference on Distributed Computer Systems, IEEE Comp. Soc. Press vol. 11, pp. 208-217 (1991).
Decision to Grant dated Nov. 14, 2016 from Belarus Patent Application No. a20121441 with English Translation, 15 pp.
Durable Distributed Cache Architecture, retrieved from the Internet at URL: http://www.nuodb.com/explore/newsql-cloud-database-ddc-architecture on Feb. 4, 2015, 3 pp.
Final Office Action dated Nov. 24, 2017 from U.S. Appl. No. 14/215,401, 33 pages.
Final Office Action dated Nov. 3, 2016 from U.S. Appl. No. 14/215,401, 36 pp.
Final Office Action dated Sep. 9, 2016 from U.S. Appl. No. 14/215,461, 26 pp.
First Examination Report issued by the Canadian Intellectual Property Office for Application No. 2,793,429, dated Feb. 14, 2017, 3 pages.
Garding, Alerting on Database Mirroring Events, Apr. 7, 2006, 24 pages.
Hull, Autoscaling MYSQL on Amazon EC2, Apr. 9, 2012, 7 pages.
International Preliminary Report on Patentability received for PCT/US2014/033270, dated Oct. 13, 2015. 4 pages.
International Search Report and Written Opinion dated Jul. 15, 2016 from PCT/US2016/27658, 37 pp.
International Search Report and Written Opinion dated Oct. 28, 2016 from PCT/US16/34651, 16 pp.
International Search Report and Written Opinion dated Sep. 8, 2016 from PCT/US16/37977, 11 pp.
International Search Report and Written Opinion dated Sep. 9, 2016 from PCT/US16/34646, 12 pp.
International Search Report dated Sep. 26, 2012 from PCT/US2011/029056, 4 pp.
International Search Report for PCT/US2014/033270(2 sheets) and Written Opinion of the International Searching Authority (3 sheets).
Iqbal, Performance TradeoH's in Static and Dynamic Load Balancing Strategies, 1986, pp. 1-23.
Leverenz et al., "Oracle8i Concepts, Partitioned Tables and Indexes," Chapter 11, pp. 11-2-11/66 (1999).
Non-Final Office Action dated Feb. 1, 2016 from U.S. Appl. No. 14/215,461, 19 pp.
Non-Final Office Action dated Feb. 1, 2016 from U.S. Appl. No. 14/251,461, 19 pp.
Non-Final Office Action dated Feb. 6, 2014 from U.S. Appl. No. 13/933,483, 14 pp.
Non-Final Office Action dated Jan. 21, 2016 from U.S. Appl. No. 14/215,401, 19 pp.
Non-Final Office Action dated Jun. 1, 2017 from U.S. Appl. No. 14/215,461, 21 pp.
Non-Final Office Action dated Jun. 2, 2017 from U.S. Appl. No. 14/744,546, 25 pp.
Non-Final Office Action dated May 31, 2017 from U.S. Appl. No. 14/215,401, 27 pp.
Non-Final Office Action dated Oct. 10, 2012 from U.S. Appl. No. 13/525,953, 8 pp.
Non-Final Office Action dated Sep. 19, 2017 from U.S. Appl. No. 14/726,200, 37 pages.
Non-Final Office Action dated Sep. 21, 2017 from U.S. Appl. No. 14/688,396, 31 pages.
Non-Final Office Action dated Sep. 23, 2016 from U.S. Appl. No. 14/616,713, 8 pp.
Notice of Allowance dated Apr. 1, 2013 from U.S. Appl. No. 13/525,953, 10 pp.
Notice of Allowance dated Feb. 29, 2012 from U.S. Appl. No. 13/051,750, 8 pp.
Notice of Allowance dated Jul. 27, 2016 from U.S. Appl. No. 14/215,372, 12 pp.
Notice of Allowance dated May 14, 2012 from U.S. Appl. No. 13/051,750, 8 pp.
Oracle Database Concepts 10g Release 2 (10.2) Oct. 2005, 14 pages.
Rahimi, S. K. et al., "Distributed Database Management Systems: A Practical Approach," IEEE Computer Society, John Wiley & Sons, Inc. Publications (2010), 765 pp.
Roy, Efficient Autoscaling in the Cloud using Predictive Models forWorkload Forecasting, 2011, pp. 500-507.
Searchcloudapplications.techtarget.com, Autoscaling Definition, Aug. 2012, 1 page.
Shaull, R. et al., "A Modular and Efficient Past State System for Berkeley DB," Proceedings of USENIX ATC '14:2014 USENIX Annual Technical Conference, 13 pp. (Jun. 19-20, 2014).
Shaull, R. et al., "Skippy: a New Snapshot Indexing Method for Time Travel in the Storage Manager," SIGMOD'08, Jun. 9-12, 2008, 12 pp.
Shaull, R., "Retro: A Methodology for Retrospection Everywhere," A Dissertation Presented to the Faculty of the Graduate School of Arts and Sciences of Brandeis University, Waltham, Massachusetts, Aug. 2013, 174 pp.
U.S. Appl. No. 14/215,372, filed Mar. 17, 2014, Ottavio.
U.S. Appl. No. 14/215,401, filed Mar. 17, 2014, Palmer.
U.S. Appl. No. 14/215,461, filed Mar. 17, 2014, Palmer.
U.S. Appl. No. 14/616,713, filed Feb. 8, 2015, Levin.
U.S. Appl. No. 14/688,396, filed Apr. 16, 2015, Shaull.
U.S. Appl. No. 14/725,916, filed May 29, 2015, Rice.
U.S. Appl. No. 14/726,200, filed May 29, 2015, Palmer.
U.S. Appl. No. 14/744,546, filed Jun. 19, 2015, Massari.
U.S. Appl. No. 15/296,439, filed Oct. 18, 2016, Ottavio.
Veerman, Database Load Balancing, MySQL 5.5 vs PostgreSQL 9.1, Apr. 2, 2012, pp. i-51.
Yousif, M. "Shared-Storage Clusters," Cluster Computing, Baltzer Science Publishers, Bussum, NL, vol. 2, No. 4, pp. 249-257 (1999).

* cited by examiner

DATABASE MANAGEMENT SYSTEM WITH DATABASE HIBERNATION AND BURSTING

CROSS REFERENCE TO RELATED APPLICATIONS

This application claims the benefit, under 35 U.S.C. § 120, as a continuation of U.S. patent application Ser. No. 14/247,364, now U.S. Pat. No. 10,037,348, filed Apr. 8, 2014, entitled "Database Management System With Database Hibernation and Bursting," which claims a priority benefit, under 35 U.S.C. § 119(e), to U.S. Provisional Patent Application Ser. No. 61/809,701, filed Apr. 8, 2013, entitled "Database Management System," the disclosure of each of which is incorporated herein by reference in its entirety.

U.S. Pat. No. 8,224,860 granted Jul. 17, 2012 for a Database Management System and assigned to the same assignee as this invention is incorporated in its entirety herein by reference.

BACKGROUND OF THE INVENTION

Field of the Invention

This invention generally relates to database management systems and more specifically to efficient management of multi-user, on-demand, distributed relational databases at a plurality of database processing resources, each of which may contain a plurality of databases.

Description of Related Art

Over the last few decades interest in databases has been increasing. Databases have been growing in size. A variety of database management systems have been developed to manage such databases. As the size of a database has increased, there has been and continues to be a requirement for providing resources of increased capability to operate such database management systems.

The requirement for increased resources previously has been met by adding or substituting storage resources and by the addition of or the replacement of existing processor resources with new storage and/or processor resources with greater capabilities. Consequently over time the total cost of ownership ("TCO") that includes hardware, facility and power costs has been increasing and has been threatening to impact the benefit of the database versus the TCO of that database.

The above-identified U.S. Pat. No. 8,224,860 provides an alternative database management system that limits the rate of increase of the total cost of ownership. This system operates as a distributed database processing system. Users connect to the system through transactional nodes (also called "transaction engines"). Each of one or more storage managers (or "archival nodes") stores all the data and metadata for the entire database. Increases in the database size are compensated by increasing the storage capacity of such storage managers without an upgrade of the hardware that implements the storage manager. However, a transaction engine at any given time must store and process only that data and metadata as required for responding to a query. Operations are performed asynchronously by means of messages transmitted and received between the various transaction engines and storage managers. Transaction engines do not require large memories and the processing of information is simplified, so the resources of a transaction engine are not subject to any significant change as a database grows over time. Consequently, the TCO of such a database management system can be relatively insensitive to changes in database size. Historically, this database management system has been employed to implement management and control over a single, large database with multiple locations, or nodes, from which multiple users access the database.

More recently "cloud computing" has been applied in environments where a provider enables a number of different users to access to a number of different "small" databases. In addition, new server configurations now are available that have somewhat limited resources, but that operate with significantly reduced power, space and related costs. A typical server includes multiple data processors that operate with resources that are limited in comparison to more sophisticated data processing systems. Each server data processor can manipulate multiple databases. In these systems the multiple data server data processors operate collectively. Moreover, each database must be available or "on-line" at all times even during periods during which the database operates with little or no activity. The operational state of such server data processors and databases can be monitored and a database can be made inactive to free up resources. However, when a database is made inactive in such an environment, it is "off-line" and a user must wait for the database to be restored before operations can begin. This introduces a delay which, in many situations and environments, cannot be tolerated. Also, at times operations of a given database in a specific server data processor may tax the available resources to the detriment of processing other databases as, for example, when a user submits a request that initiates a series of rapid transactions. This can also introduce an unacceptable delay.

What is needed is a database management system that is operable in a cloud computing environment, that can disable an inactive database to optimize the operation of a server and can compensate for an allocation of significant resources to one database on the server to the detriment of other databases, all transparently to the user and automatically without direct intervention by administrative personnel.

SUMMARY

Therefore it is an object of this invention to provide a database management system that efficiently controls a network with a plurality of servers each comprising a plurality of independent data processors.

Another object of this invention is to provide a database management system that efficiently controls a network with a plurality of servers each comprising a plurality of independent data processors with multiple databases and that can selectively disable an "inactive" database.

Yet another object of this invention is to provide a database management system that efficiently controls a network with a plurality of servers each comprising a plurality of data processors and multiple databases, that selectively disables an "inactive" database and that facilitates reconnection of the inactive database in the network.

Still yet another object of this invention is to provide a database management system that efficiently controls a network with a plurality of servers each comprising a plurality of data processors and multiple databases that can transfer a database from a server data processor to another data processing system with increased resources for processing and thereafter transfer the database back to one of the server data processors.

Yet still another object of this invention is to provide methods for disabling inactive databases and transferring databases that require increase resources independently of and transparently to both a user and network administrators.

In accordance with one aspect of this invention, a database management system includes a server with a plurality of server data processors. Each server data processor assigns resources for processing each of a plurality of databases and each server data processor includes a memory and a processor and means for recording operational information about that server data processor. Each database therein includes a criterion that indicates a lack of activity for that database to enable the removal of an inactive database transparently to and independently of a user for that database by an iterative method of this invention. During each iteration there is an analysis of the criterion with respect each database in the server data processor for determining whether a threshold has been reached that defines an inactive state for that database. When this condition is detected, the database is deactivated thereby to release resources assigned to that database for use by other databases resident in the server data processor.

In accordance with another aspect of this invention, a database management system includes a server with a plurality of server data processors having a given set of resources for processing a database. Each server data processor assigns resources for processing each of a plurality of databases and includes a memory and a processor and means for recording operational information about server data processor and each database therein including a criterion that indicates that resources required for processing one of the databases is excessive. During a method of this invention such a database is transferred to another data processor with increased resources transparently and independently of a user for that database. The method includes an identification of the database and the server data processor from which the database is to be transferred. Information about the database is transferred to the other data processor. Then the database in the server data processor is disabled thereby to release resources assigned to the transferred database for use by other databases resident in the server data processor.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
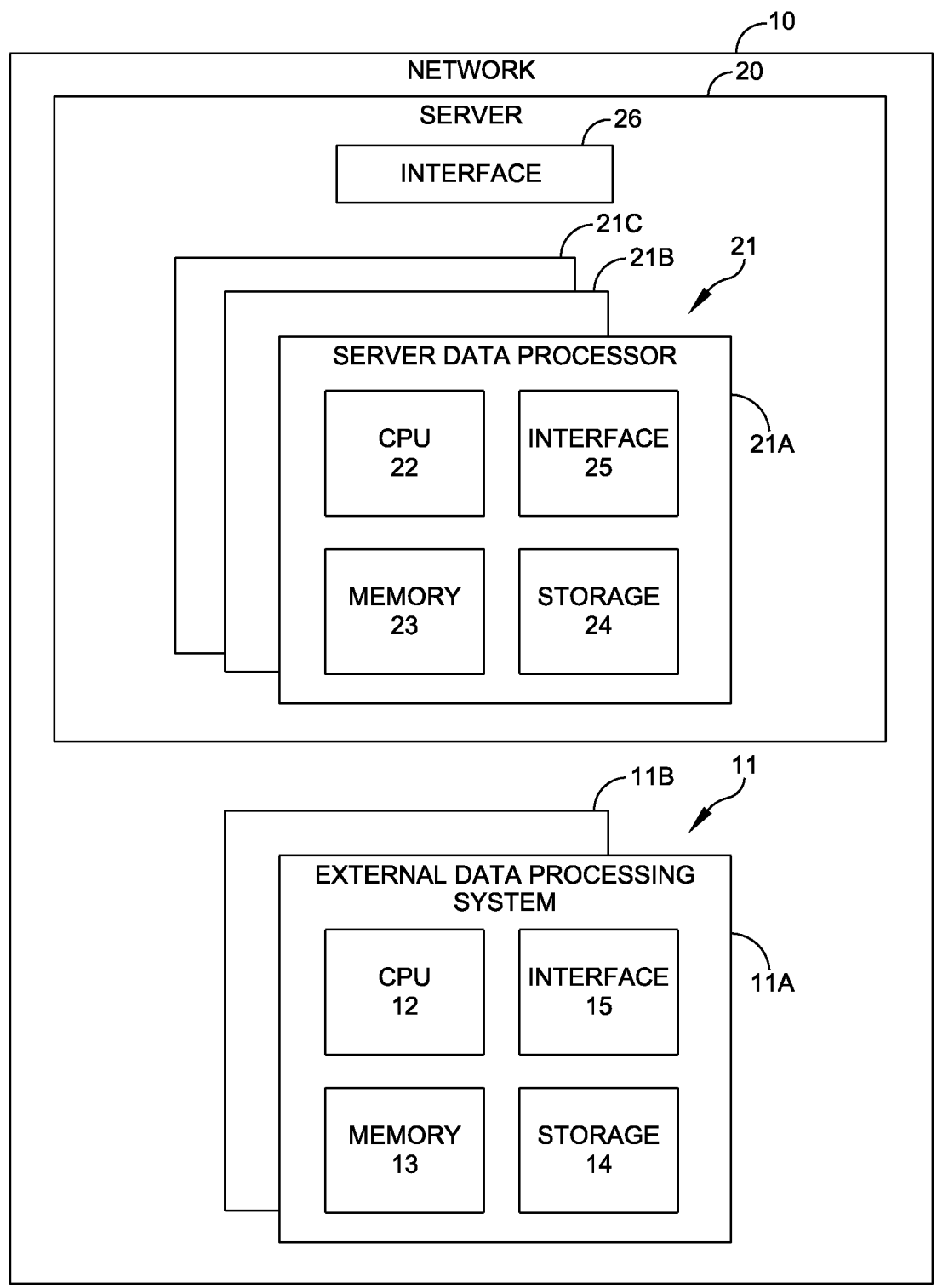
FIG. 1 is a block diagram of a data processing network that incorporates a database management system with this invention and is implemented by a server with multiple server data processors and an optional external data processing system.

In FIG. 1 a network 10 includes an array of components that can be operated in accordance with and achieve the benefits of this invention. Such a network 10 may have different implementations. The network 10 depicted in FIG. 1 includes at least one external data processing system 11; the specific embodiment of FIG. 1 depicts external data processing systems 11A and 11B. Each external data processing system will have the same basic configuration as characterized by the external data processing system 11A that includes a central processor unit ("CPU") 12, a memory 13, a storage component 14 and an interface 15. The memory 13 normally comprises random access memory in any of a variety of forms. The storage component 14 generally will include disk storage or comparable storage components. Such systems are known in the art and are similar to data processing systems that operate with conventional database management systems.

The network 10 additionally includes a server 20 comprising a plurality of server data processors 21, such as the three depicted server data processors 21A, 21B and 21C. Any given server could include any number of server data processors. Such servers are known in the art. By way of example, server data processor 21A includes as major components a CPU 22, a memory 23, a storage component 24 and an interface 25.

Each of the interfaces 15 and 25 provides signal and data paths for interconnecting the various components of their respective data processors. Memory 23 typically will have a multiple gigabyte capacity and each unit of storage will have a storage capacity of hundreds of gigabytes or more. A network interface 26 provides signal and data paths between each of the external data processing systems 11A and the server 20, between the external data processing systems and users, and between the server 20 and users.

The components of the network 10 are formed of conventionally available hardware and control systems. When implementing this invention, commercially available linking software can link the storage components 24 in an integrated disc pool that is available to all of the server data processors, such as server data processors 21A, 21B and 21C. The server 20 can also be characterized as an integrated multi-processing network whereby each server data processor can operate independently of the others.

In accordance with this invention, each of server data processors 21 and of the external data processing systems 11 operates in response to a database management system such as a NuoDB® database management system defined in the above-identified U.S. Pat. No. 8,224,860 and marketed by NuoDB, Inc. of Cambridge, Mass. Each server data processor 21 has the capability of processing multiple independent databases. Although the actual number of databases in any given server data processor 21 depends upon a number of factors, such as database size, each server data processor has the capability of storing hundreds of smaller databases.

A database management system incorporating this invention provides three important functions for facilitating the operation of the network 10 in FIG. 1. These functions are dependent upon monitoring each server data processor. If operations in a server data processor reach some level of activity indicating that the database is not in use, a first function deactivates the database thereby restoring its allocated resources for use by other databases. As a second function, if a user makes a request for such a deactivated database, the server 20 identifies one of the server data processors as a host for that database and initiates a request for that database thereby automatically establishing a connection between the user and the requested database. For a third function measurements are made of resources available in each server data processor for identifying a resident database that is making unexpected demands on the available resources to the detriment of co-resident databases on that database server data processor. When such a condition is detected, the identified database migrates to a data processing system typically with greater capabilities such as one of the data processing systems 11, or even to another server data processor. Conversely, that migrated database is also monitored and, upon a significant reduction in a demand on resources, is transferred back to one of the server data processors 21. All these functions are performed transparently with respect to and independently of any direct action by a user or an administrator.

Figure 2:
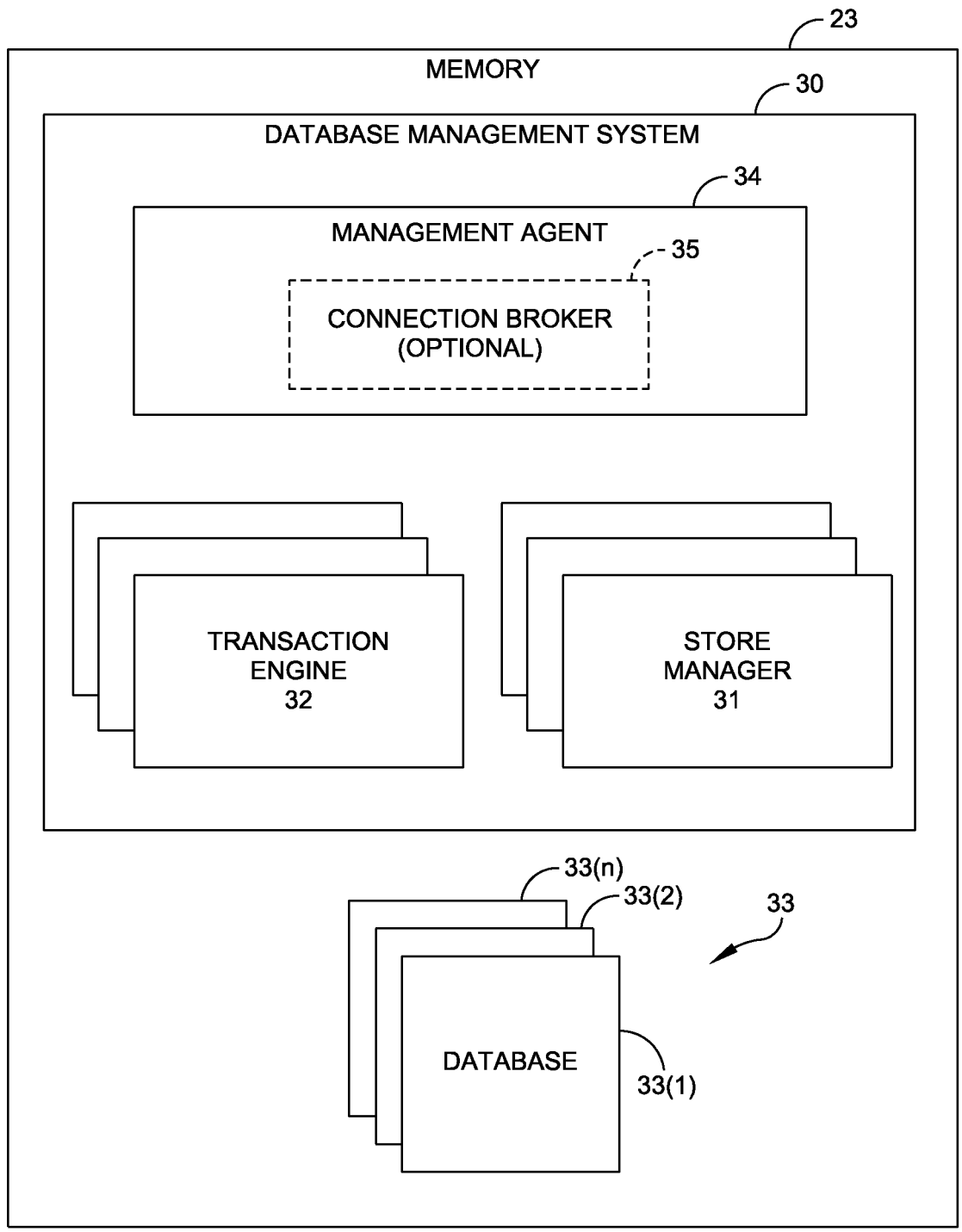
FIG. 2 is a block diagram of a memory associated with a server data processor or an external data processor.

FIG. 2 depicts the organization of a typical server data processor memory, such as the memory 23 in server data processor 21A in FIG. 1. This memory 23 stores a database management system 30. In accordance with the database management system provided by the Assignee of this invention, the database management system 30 includes a number of elements that interact with and control the interactions with databases, such as the databases 33(1), 33(2) and 33(n) as representative of even hundreds of databases. Within the environment for this invention, a transaction engine 32 associated with each database creates, tracks and ends database transactions in response to database commands from a database request engine (not shown, but known in the art). A database request engine is an interface between high level input and output commands at the user level, and input and output demands at the systems level. The database request engine parses, compiles and optimizes user queries such as SQL queries into commands that are interpreted by various classes or objects and are interpreted by the database management system. Each transaction engine also performs other functions as, for example, indicating the current status of transactions.

Still referring to FIG. 2, a storage manager 31 associated with each database stores all the data and metadata in that database as an archive. Applicant's database management system, as previously indicated, only processes that data and metadata as is relevant to a particular query as the database is parsed into fragments of data and metadata, called atoms. Messages transfer copies of data and metadata atoms from with a storage manager such as the storage manager 31 in the pool of storage components 24 as previously described. There is one instance of a transaction engine for each database and, in accordance with Applicant's system, such a transaction engine may be replicated to any one of the processors in FIG. 1 that are also processing the same database.

As shown in FIG. 2, the database management system 30 at each of the server data processors and external data processing systems in the network 10 includes a management agent 34. Each management agent 34 performs a number of functions including monitoring various operations and states within a server data processor, such as the server data processor 21A. For example, management agent 34 for server data processor 21A may monitor the number of active databases being handled by the server data processor 21A, the rates at which transactions have been initiated during a specific time period for each database and a profile of each database such as its storage requirements. One or more database management systems 30 may be designated as a connection broker 35. Connection brokers and their operations are known in the art.

Figure 3:
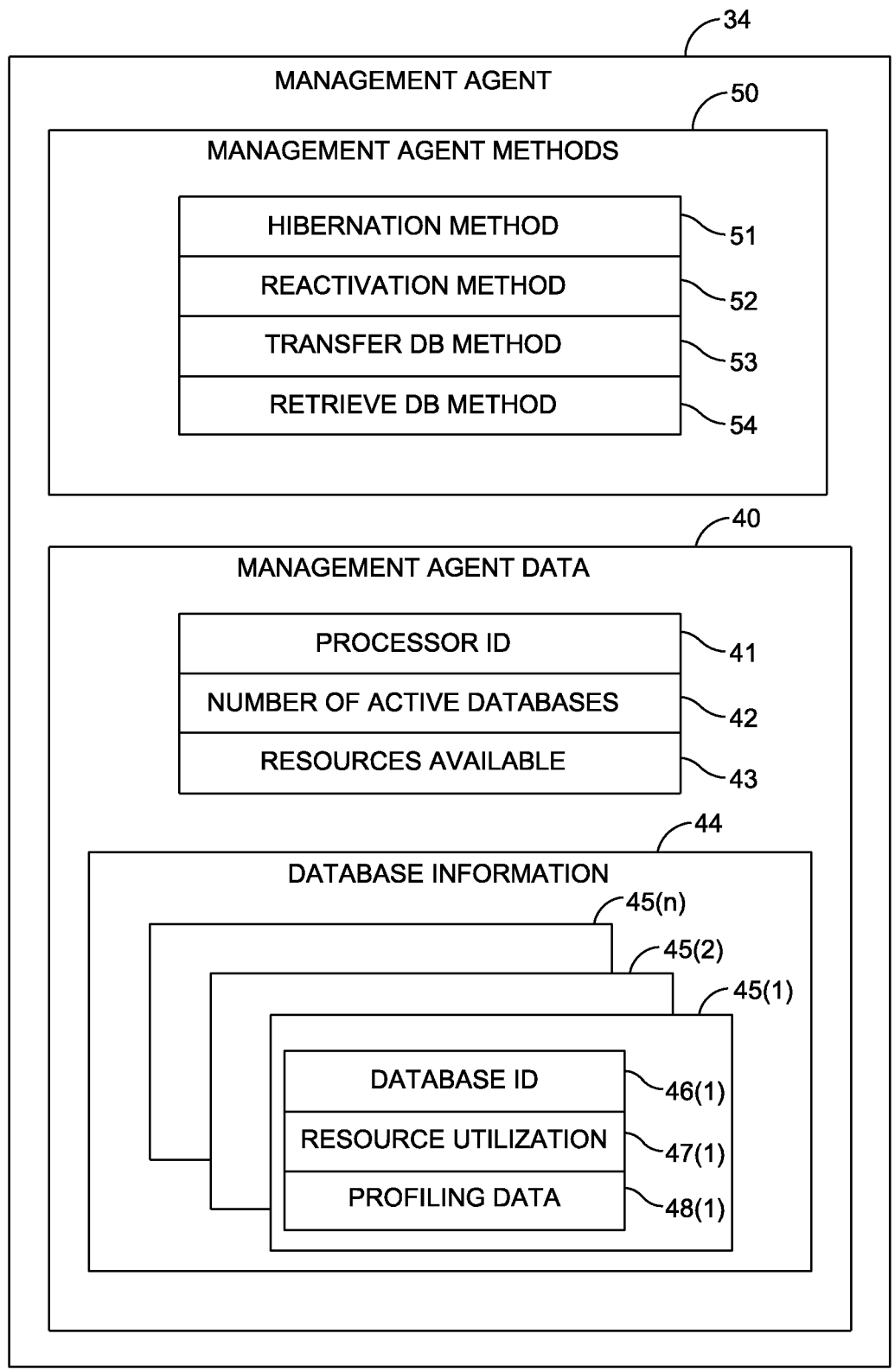
FIG. 3 is a block diagram of portions of a management agent shown in FIG. 2.

FIG. 3 discloses certain information maintained by a management agent 34 as management agent data 40. In one embodiment management agent data 40 comprises processor identification 41, the number of currently active databases 42 and an entry listing any resources that are available for that processor. A database information module 44 includes information about each database represented as database information blocks 45(1), 45(2), 45(n). As shown specifically with respect to database information block for database 45(1), this information can include a database identification 46(1), information about resource utilization at 47(1) such as the current percentage of the CPU processing time that is being utilized. Profiling data information at 48(1) could include transaction rates and related information concerning the operating state of the corresponding server data processor.

Still referring to FIG. 3, a management agent 34 includes a management agent methods module 50. For implementing this invention, a management methods module 50 includes four methods. These include a hibernation method 51 that in adapted to disable an inactive database on a server data processor. A reactivation method 52 reactivates an inactive database immediately upon receiving a request for that inactive database. The combination of the hibernation method 51 and reactivation method 52 enables each server data processor to disable any included database that is deemed to be inactive and then, upon receiving a request for that database, to return the database to an active state in the same or other server data processor, all transparently to the user.

A transfer DB method 53 enables a server data processor to identify any database that requires such a significant proportion of the available resources that may have a negative effect on the performance of other databases. The transfer DB method 53 monitors the database operations in a server data processor. Upon identifying a database that is using an unacceptable level of resources, the transfer DB method 53 transfers the identified database to one of the external data processing systems 11 in FIG. 1, although such a transfer could also be made to another server data processor. When the demands of a transferred database are reduced to acceptable level, a retrieve DB method 54 typically transfers the database to another server data processor. Such a transfer might also be made to another one of the external data processing systems 11. Transfers made in response to the transfer DB method 53 and the retrieve DB method 54 occur transparently to and independently of the user and of an administrator.

With these features enabled, resources in each of the server data processors operate with efficiency. For example, there is no need to permanently maintain a database in an active state when it is not being used on a regular basis. If a database at a particular server data processor requires greater resources, that database can be transferred to an external database that may have greater resources. As a result the server data processor from which the database is transferred operates with greater efficiency with respect to other databases therein and the external data processor may process the transferred database more efficiently.

Figure 4:
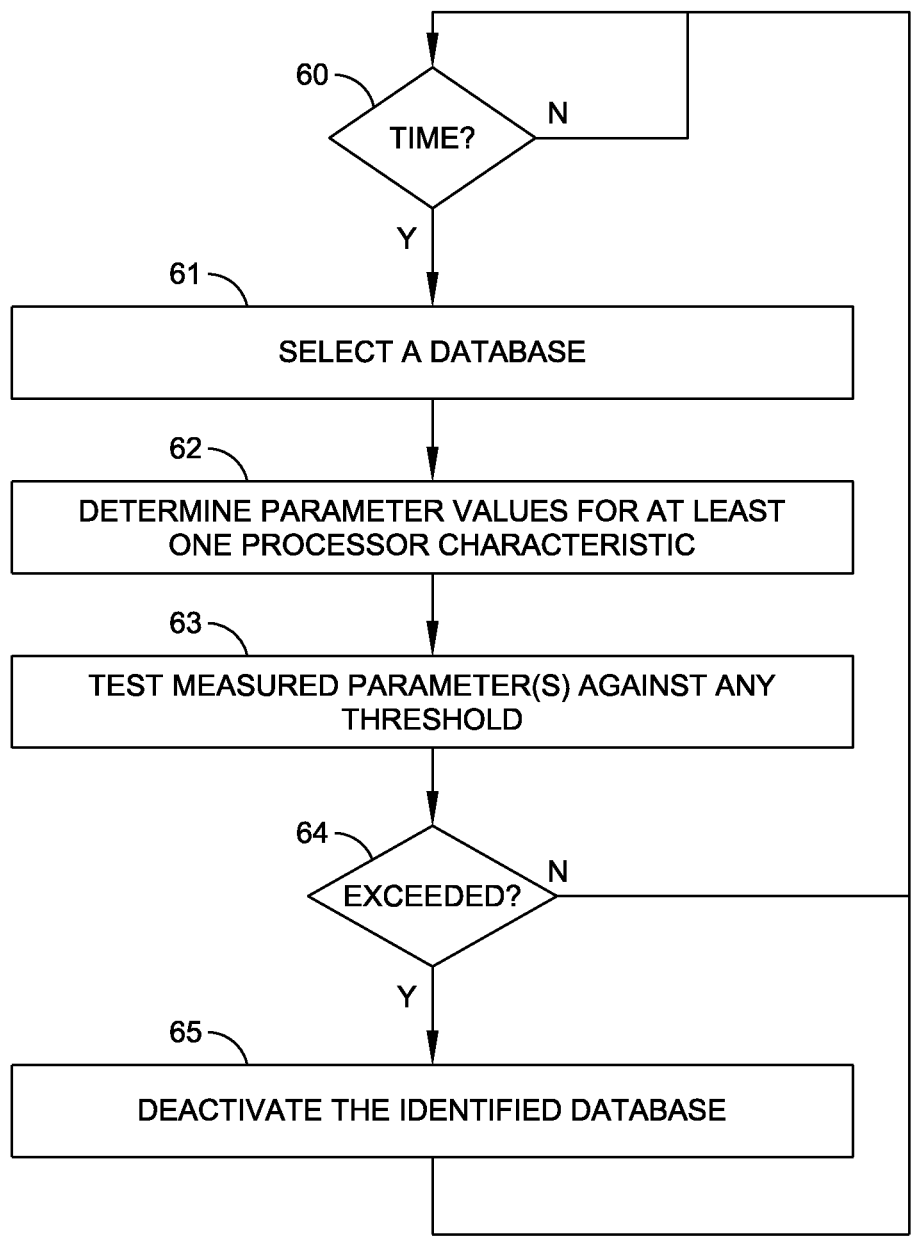
FIG. 4 is a flow chart that describes a hibernation method by which a database is rendered inactive.

FIG. 4 depicts the hibernation method 51 logical operations that operate at each of the server data processors. The hibernation method is a time-driven iterative process set by some timing structure as represented by step 60. When the time for an iteration occurs, step 60 transfers control to step 61 to select a database for hibernation. Step 62 selects various parameters that either singly or in combination are used to determine and define an "inactive" database. Typical parameters include the number of active databases and the rate of transaction processing in the transaction engine. Step 63 tests the measured parameters against one or more thresholds. If the threshold or thresholds are not exceeded, step 64 transfers control back to step 60 to await the next iteration with the selection of a new database. If the thresholds have been exceeded, such as an indication that no SQL command has been processed by the database for the last fifteen minutes, steps 64 transfers control to step 65 that deactivates the identified database. In one embodiment, the management agent 34 disables the transaction engine and storage manager for that database. However, in accordance with operation of Applicant's database management system, a copy of that database remains in a storage component 24 that may also be accessible through the pool of storage resource components 24. As a result, the load on the server data processor has been reduced without having to make a transfer of any database.

Figure 5:
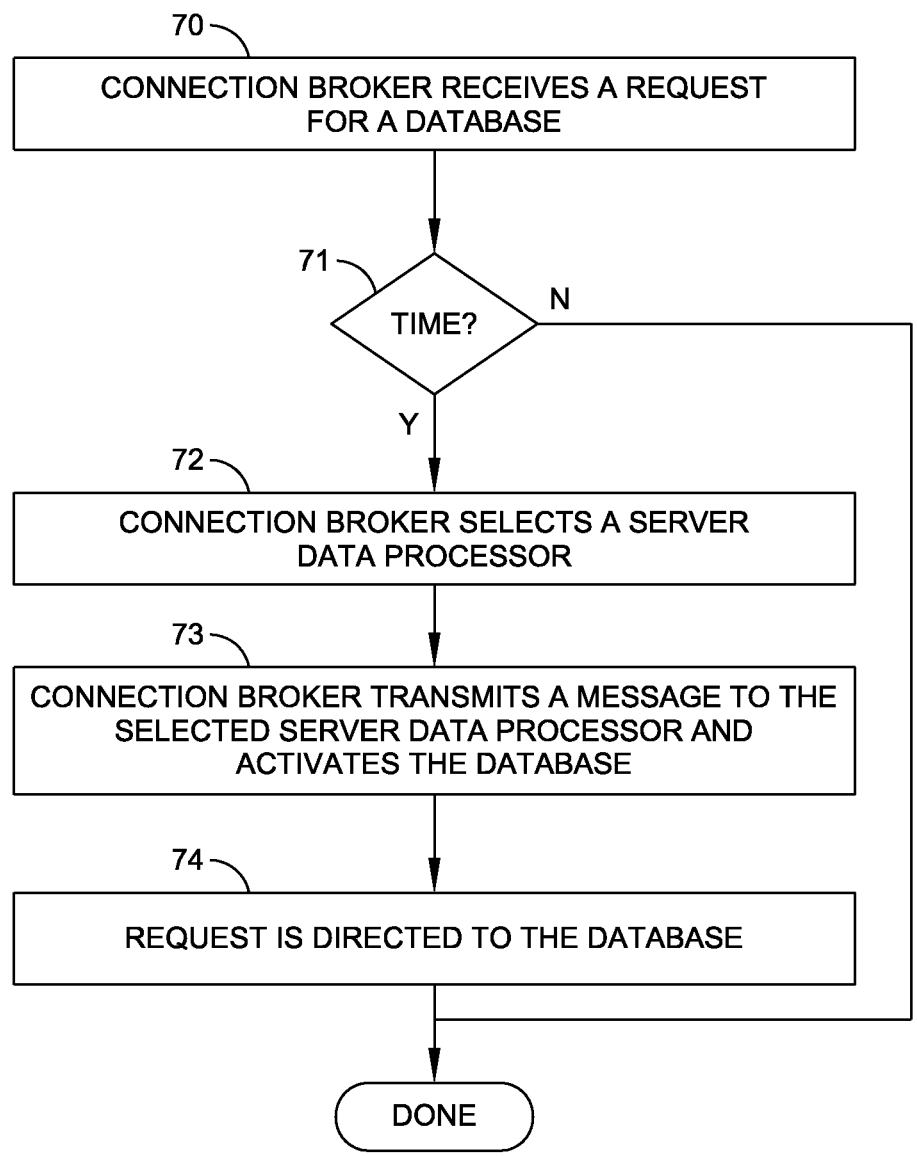
FIG. 5 is a flow chart of a reactivation method that, upon demand, reinstates or returns an inactive database to an active status.

Once such a database becomes inactive due to the operation of the hibernate method 51, nothing further occurs until, as shown in FIG. 5, a connection broker receives a request for some operation concerning that database. A connection broker, as previously indicated, is optionally included as a component of a management agent. A connection broker can be connected to one, some or all of the database management agents for all the server data processors. When a connection broker receives any request for access to a database at step 70 in FIG. 5, step 71 determines whether the requested database is inactive. If it is active, the reactivation method 52 terminates. When the requested database is inactive, step 71 transfers control to step 72 whereupon the connection broker selects a server data processor to receive the inactive database. There are several alternatives for performing this selection function. The connection broker has access to all the statistics in all the related management agents it supervises and can make a number of parameter comparisons to select a server data processor. Typical parameters might include the number of databases associated with each server data processor, the percent CPU utilization and available free memory space. Once that selection is made, the connection broker uses step 73 to transmit a message to the selected server data processor and to activate the database as, for example, by starting a transaction engine and a storage manager Step 74 directs the request that was initially processed by step 71 to the database to initiate for a response to the user.

The architecture of Applicant's database management system enables the processing of a hibernation method 51 and a reactivation method 52 to occur in such a short time interval that the user is not aware of either method having been executed. Consequently, the steps of the hibernation method 51 and the reactivation 52 are transparent to the user.

Figure 6:
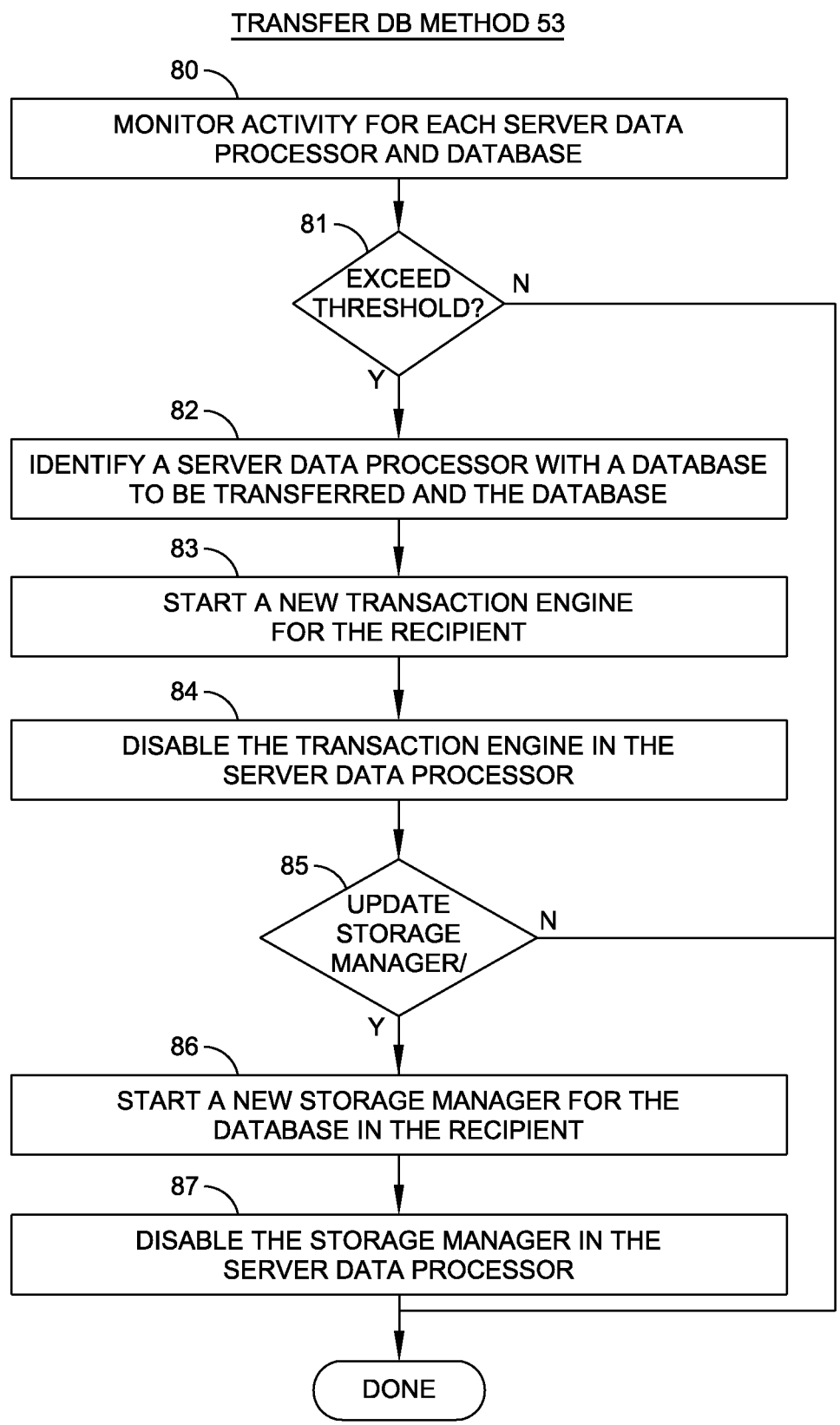
FIG. 6 is a flow chart of a method that enables the transfer of a database from one data processor to another.

Now referring to FIG. 6 and as previously indicated, from time to time a database that is resident in a server data processor can experience a "burst" of activity such that the server data processor is unable to process requests for that and other resident databases without exhibiting some performance degradation. In the transfer DB method 53 a memory agent, such as the memory agent 34 in FIG. 3, monitors activity for each server data processor and each database in each server data processor. CPU usage, re-usage, transaction rates, reaction times from the receipt of a message and its acknowledgement, or others can be utilized in making a decision concerning such a transfer. Step 80 represents this monitoring function and an analysis of various ones of the foregoing or other parameters to determine whether a threshold or combination of thresholds has been exceeded. If the threshold has not been exceeded, step 81 terminates the operation of the transfer DB method 53.

If the threshold is exceeded, step 81 transfers to step 82 whereupon the management agent 34 identifies a server data processor with the database to be transferred, the database and a recipient for that database, typically one of the external data processing systems 11. However, as will be apparent, the designated recipient might be another of the server data processors 21. During step 83 the management agent unit in step 83 starts a new transaction engine at the recipient data processing system. Step 84 disables the transaction engine in the server data processor. If the transfer is being made to another server data processor, it may not be necessary to generate a new storage manager because the storage management for this database may already exist in the pool of the storage components 24. However, if the transfer is to be made to an external data processing system, it is necessary to update the storage manager associated with the database. In this situation, step 85 transfers control to step 86 whereupon the management agent starts a new storage manager in the recipient for that database being transferred and synchronizes the two the storage managers. Step 87 disables the storage manager in the server data processor from which the database is being transferred. As previously described, the transfer DB method 53 enables two favorable results. First resources in the server data processor required for the transferred database are freed thus improving the server data processor operations. If the transfer is made to an external data processing system 11, its greater resources may process the transferred database more efficiently while it requires increase resources. Both are positive results and the transfer occurs transparently to the user.

As now can be understood, the transfer DB method 53 is particularly appropriate for use when a server data processor database undergoes an interval of high resource requirement. For example, a theatre ticket sales database application may involve intervals of high activity for a short interval after an announced date of availability. The transfer DB method 53 allows that database to be transferred to an external data processor with greater resources for handling the burst of activity thereby eliminating any impact on the other databases in the server data processor. The operation of this method is transparent to the user and occurs without intervention by a network administrator.

Figure 7:
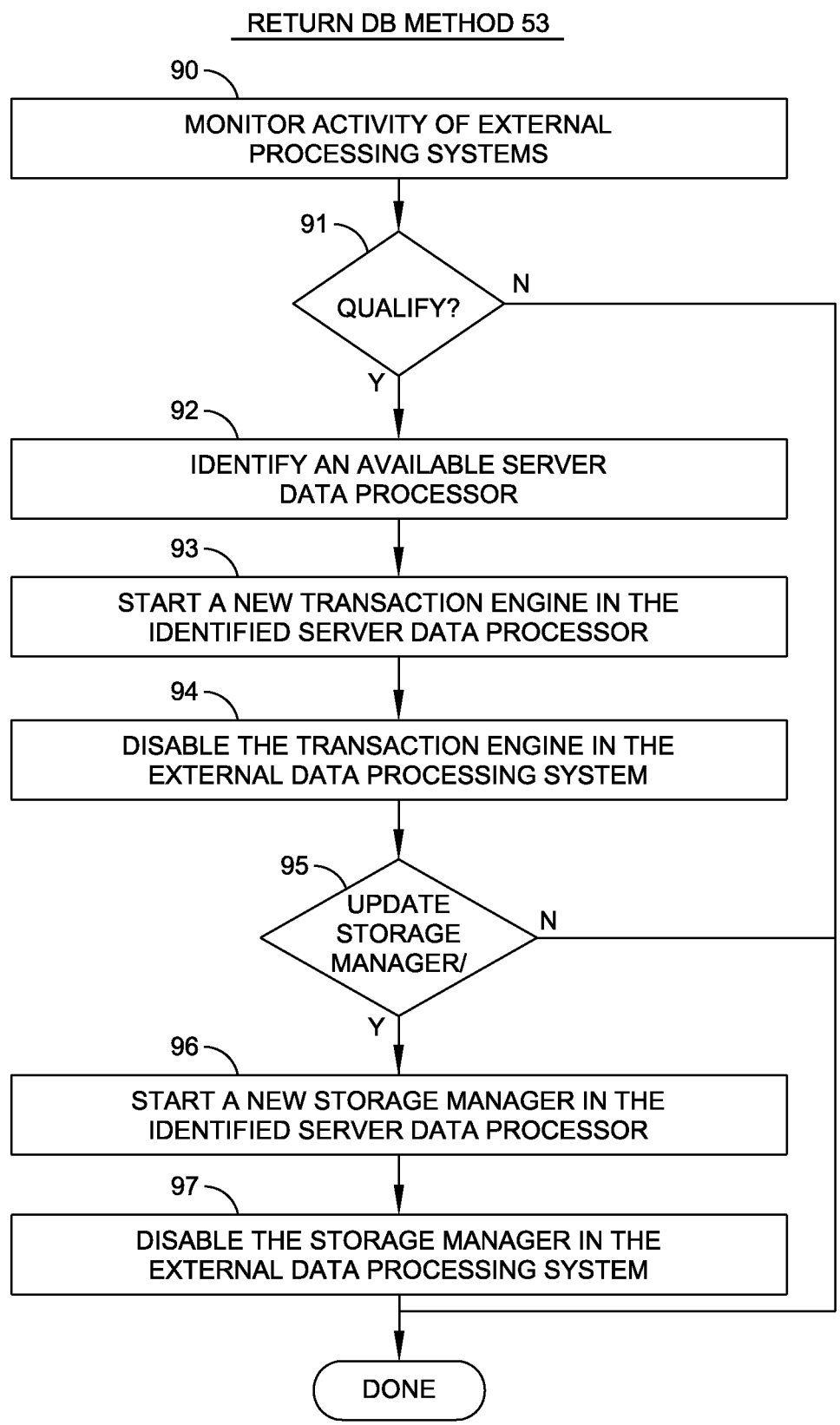
FIG. 7 is a flow chart of a method that enables a database that has been previously been transferred to be returned.

Most databases alternate between intervals of high and low demands for resources. As represented by step 90 in FIG. 7, management agents continue to monitor the level of database resource demands and analyze these demands against predetermined thresholds. So long as this is occurring, the return DB method 54 uses step 91 to take no action. When the resource demand falls below a threshold, step 91 shifts control to step 92 as a first operation in the method. In step 92 the connection broker identifies an available server data processor for receiving the database. Then the management agent uses step 93 to start a new transaction engine in the identified server data processor and step 94 to disable the transaction engine in the external processing system.

If the connection broker determines that an existing storage manager is available to the server data processor as in the previously described memory pool, step 95 terminates the operation. Otherwise step 95 transfers control to step 96 whereupon the connection broker produces a copy of the storage manager for the database in the identified server data processor and initiates a transfer to that new storage manager from an archive of the database. After the information has been synchronized, step 97 disables the storage manager in the external data processing system and thereby eliminates and removes the database from that external data processing system. That is, after the return DB method 54 has been completed, the originating external data processing system no longer contains a transaction engine or storage manager and the identified server data processor has a storage manager and transaction engine for the database.

As will now be understood, the existence of the four methods described with respect to FIGS. 4 through 7 enables a database management system to operate and meet the various objects of this invention. Such a database management system efficiently controls a network with a plurality of servers each comprising a plurality of independent data processors with multiple databases and that can selectively disable an "inactive" database. With the methods of FIGS. 4 and 5, the database management system selectively disables an "inactive" database and that facilitates reconnection of the inactive database in the network. The presence of the methods of FIGS. 6 and 7 enables the database management system to transfer a database from a server data processor to another data processing system with increased resources for processing and thereafter transfer the database back to one of the server data processors.

This invention has been disclosed in terms of certain embodiments. It will be apparent that many modifications can be made to the disclosed embodiment of this invention. Therefore, it is the intent of the appended claims to cover all such variations and modifications as come within the true spirit and scope of this invention.

What is claimed as new and desired to be secured by Letters Patent of the United States is:

1. A method of deactivating a database from a first server data processor and reactivating the database on a second server data processor, the method comprising:
    at a scheduled time, selecting the database from a plurality of databases on the first server data processor, wherein the database is associated with a first transaction engine and a first storage manager, wherein the first storage manager stores data and metadata of the database, and wherein the first transaction engine indicates a current status of transactions;
    selecting at least one parameter, wherein the at least one parameter comprises at least one of: a number of active databases or a rate of transaction processing;
    conducting an analysis of the at least one parameter with respect to a threshold, the analysis indicating that the database is inactive;
    in response to determining that the database is inactive, deactivating the database, wherein the deactivating disables the first transaction engine and the first storage manager;
    retaining a copy of the database in a storage component;
    receiving a request for access to the database;
    selecting the second server data processor to receive the database;
    activating the database in the second server data processor, wherein the activating comprises starting a second transaction engine and a second storage manager; and
    directing the request to the second server data processor and database.

2. The method of claim 1, further comprising:
    at another scheduled time, selecting another database from the plurality of databases on the first server data processor;
    selecting the at least one parameter for the other database;
    conducting an analysis of the at least one parameter for the other database with respect to the threshold, the analysis indicating the other database is inactive; and
    deactivating the other database.

3. The method of claim 1, wherein deactivating the database releases resources assigned to the database for use by other databases in the plurality of databases.

4. The method of claim 1, wherein the database is a first database and further comprising:
    at another scheduled time, selecting a second database from the plurality of databases on the first server data processor;
    selecting the at least one parameter for the second database;
    conducting an analysis of the at least one parameter with respect to the threshold, the analysis indicating that the second database is active; and
    selecting a third database from the plurality of databases on the first server data processor.

5. The method of claim 4, further comprising:
    selecting the at least one parameter for the third database; and
    conducting an analysis of the at least one parameter with respect to the threshold.

6. The method of claim 1, wherein conducting the analysis of the at least one parameter comprises determining when the database last processed a database command.

7. The method of claim 1, wherein selecting the second server data processor includes identifying the second server data processor as a server data processor with sufficient available resources for processing the database.

8. The method of claim 1, wherein selecting the second server comprises determining at least one of: a number of databases associated with the second server data processor, CPU utilization, and available free memory.

9. A method of transferring a database in a plurality of databases from a server data processor to a data processor, the server data processor comprising a first transaction engine and a first storage manager, the data processor comprising a second transaction engine and a second storage manager, the method comprising:
    monitoring at least one parameter for each database in the plurality of databases;
    conducting an analysis of the at least one parameter with respect to a threshold, the analysis identifying the database to be transferred;
    in response to identifying the database to be transferred, initiating the second transaction engine on the data processor;
    disabling the first transaction engine in the server data processor;
    determining whether to update the second storage manager on the data processor;
    in response to determining that the second storage manager should be updated, initiating the second storage manager on the data processor; and
    disabling the first storage manager in the server data processor.

10. The method of claim 9, wherein the at least one parameter comprises at least one of a Central Processor Unit (CPU) usage, a CPU re-usage, a transaction rate, and a reaction time from receipt of a message to transmission of an acknowledgement.

11. The method of claim 9, further comprising:
synchronizing the first storage manager and the second storage manager before disabling the first storage manager.

12. The method of claim 9, wherein the data processor is an external data processor.

13. The method of claim 9, wherein the data processor is another server data processor.

14. The method of claim 9, further comprising:
in response to transferring the database to the data processor, monitoring the at least one parameter for the database on the data processor.

15. The method of claim 14, further comprising:
determining that the at least one parameter is below the threshold; and
in response to determining that the at least one parameter is below the threshold, transferring the database back from the data processor to the server data processor.

16. The method of claim 9, wherein identifying the database to be transferred includes detecting a burst of activity on the database and the server data processor indicating greater utilization of resources for processing the database.

17. The method of claim 9, wherein the data processor has more resources than the server data processor.

18. A method of controlling a database in a plurality of databases on a server data processor, the database being associated with a transaction engine and a storage manager, the method comprising:
performing an analysis of activity of the database;
based on the analysis, determining that the database is in an inactive state;
deactivating the database to release resources assigned to the database for use by other databases in the plurality of databases on the server data processor; and
reactivating the database in response to a request for an operation relating to the database.

19. The method of claim 18, wherein deactivating the database includes disabling the transaction engine and the storage manager.

20. The method of claim 18, further comprising:
retaining a copy of the database in a storage component, wherein the copy is accessible through a pool of storage resource components and wherein a load on the server data processor is reduced without transferring the database.

* * * * *